United States Patent [19]

Dyott

[11] Patent Number: 4,669,814
[45] Date of Patent: Jun. 2, 1987

[54] SINGLE MODE, SINGLE POLARIZATION OPTICAL FIBER WITH ACCESSIBLE GUIDING REGION AND METHOD OF FORMING DIRECTIONAL COUPLER USING SAME

[75] Inventor: Richard B. Dyott, Orland Park, Ill.

[73] Assignee: Andrew Corporation, Orland Park, Ill.

[21] Appl. No.: 793,713

[22] Filed: Oct. 29, 1985

Related U.S. Application Data

[63] Continuation of Ser. No. 404,283, Aug. 2, 1982.

[51] Int. Cl.$^4$ .................. G02B 6/26; G02B 6/02; C03B 23/20
[52] U.S. Cl. ................. 350/96.15; 350/96.29; 350/96.30; 350/320; 65/4.1; 65/4.2; 65/4.3
[58] Field of Search ............ 350/96.10, 96.15, 96.16, 350/96.29, 96.30, 96.31, 96.32, 96.33, 96.34, 320; 65/1, 3.11, 3.13, 4.1, 4.2, 4.3

[56] References Cited

U.S. PATENT DOCUMENTS

| | | | |
|---|---|---|---|
| 3,535,017 | 10/1970 | Miller | 350/96.33 |
| 3,711,262 | 1/1973 | Keck et al. | 65/3 |
| 4,179,189 | 12/1979 | Kaminow et al. | 350/96.33 |
| 4,240,694 | 12/1980 | Pan | 350/96.15 |
| 4,274,854 | 6/1911 | Pleibel et al. | 350/96.30 X |
| 4,307,938 | 12/1981 | Dyott | 350/96.30 |
| 4,315,666 | 2/1982 | Hicks | 350/96.15 |
| 4,325,636 | 4/1982 | Schiffner | 350/96.15 |
| 4,354,736 | 10/1982 | Maklad et al. | 350/96.30 |
| 4,354,760 | 10/1982 | Schiffner | 350/96.15 |
| 4,387,954 | 6/1983 | Beasley | 350/96.15 |
| 4,410,236 | 10/1983 | Schiffner | 350/96.15 |
| 4,410,275 | 10/1983 | Shaw et al. | 356/350 |
| 4,426,129 | 1/1984 | Matsumura et al. | 350/96.33 |
| 4,440,498 | 4/1984 | Sheem | 356/350 |
| 4,444,460 | 4/1984 | Stowe | 350/96.15 |
| 4,445,780 | 5/1984 | Burns | 356/350 |
| 4,461,536 | 7/1984 | Shaw et al. | 350/96.15 |
| 4,462,699 | 7/1984 | Shaw et al. | 350/96.15 |
| 4,493,528 | 1/1985 | Shaw et al. | 350/96.15 |
| 4,536,058 | 8/1985 | Shaw et al. | 350/320 |
| 4,557,551 | 12/1985 | Dyott | 350/96.15 |
| 4,589,728 | 5/1986 | Dyott et al. | 350/96.30 |

FOREIGN PATENT DOCUMENTS

| | | | |
|---|---|---|---|
| 54-4153 | 1/1979 | Japan | 350/96.15 |
| 56-24306 | 3/1981 | Japan | 350/96.30 |
| 2038017 | 7/1980 | United Kingdom | 350/96.15 |

OTHER PUBLICATIONS

Kapany et al., "Coherent Interactions . . . and Lasers", Jour. of the Opt. Soc. of Amer., vol. 58, No. 9, 5/67–9/68, p. 1176.
Eickoff, "In Line Fibre Optic Polarizer", Electronics Lett., 8/80, vol. 16, No. 20, pp. 762–763.
Katsuyama, "Low Loss Single . . . Fibres", 6/81, Electronics Lett., vol. 17, No. 13, pp. 473–474.
Schiffner et al., "Double Core Single Mode . . . Directional Coupler", Applied Phys., vol. 23, pp. 41–45, 1980.
Dyott, "Elliptically Cored . . . Fiber", Andrew Corp. Pub., Bulletin 8683, Nov. 1981, pp. 1–4.
Ezekiel et al., "Fiber Optic . . . Review", pp. 2–25 (no date).

List continued on next page.

*Primary Examiner*—William L. Sikes
*Assistant Examiner*—Brian M. Healy
*Attorney, Agent, or Firm*—Stephen G. Rudisill

[57] ABSTRACT

An optical fiber comprising a core and cladding having different refractive indices and forming a single-mode guiding region, the core having a non-circular cross-section defining two transverse orthogonal axes which, in combination with the different refractive indices, permit the de-coupling of waves polarized along the axes. The guiding region is located sufficiently close to the surface of the fiber along a selected length of the fiber, to allow coupling to a guided wave. The outer surface of the fiber has a non-circular cross-section with a predetermined geometric relationship to the guiding region and the orthogonal transverse axes so that the location of the guiding region and the orientation of the axes can be ascertained from the geometry of the outer surface.

18 Claims, 12 Drawing Figures

OTHER PUBLICATIONS

Schoner et al., "Novel Method for Making . . . Directional Couplers", Electronic Lett., 6/82, vol. 18, No. 13, pp. 566–568.

Bergh et al., "All Single Mode Fiber-Optic Gyroscope", Optics Lett., vol. 18, No. 13, 6/82.

Dyott et al., "Preservation of Polarisation . . . Cores", Electronics Lett., vol. 15, No. 13, 6/79, pp. 380–382.

McMahon, et al. "Fiber Optic Transducers: IEEE Spectrum, Dec. 1981, pp. 24–27.

MacChesney, et al. "A New Technique for the Preparation of Low Loss and Graded Index Optical Fibers", Proceedings of the IEEE, 62 at 1280, '74.

Tasker and French "Low Loss Optical Waveguides with Prefused SiO2 Cores", Proceedings of the IEEE, 62 at 1281, '74.

SINGLE MODE, SINGLE POLARIZATION OPTICAL FIBER WITH ACCESSIBLE GUIDING REGION AND METHOD OF FORMING DIRECTIONAL COUPLER USING SAME

This application is a continuation of application Ser. No. 404,283, filed Aug. 2, 1982.

FIELD OF THE INVENTION

The present invention relates generally to the field of fiber optics, and is particularly advantageous when practiced in connection with single-mode and polarization-preserving fiber-optic waveguides.

DESCRIPTION OF THE PRIOR ART

Fiber optics is generally concerned with the transmission of light along a transparent fiber structure which has a higher refractive index than its surroundings. Currently it is possible to manufacture long, continuous strands of optical fiber which may propagate signals without substantial attenuation over long distances. It is also possible to manufacture the fiber structure as an optical waveguide wherein only preselected modes of light propagate in the fiber. By limiting wave propagation through the fiber to a single mode, the bandwidth of the optical fiber may be exceedingly high to provide a high information-transfer capacity. Moreover, optical-fiber transmission equipment is compact, lightweight, and potentially inexpensive. Transmission over optical fibers does not generate interference and is unaffected by external interference.

While the development of optical fibers for telecommunications systems is becoming rather highly advanced, the use of fiber optics for sensing and control systems is still in its early development. In sensing and control systems a fiber-optic transducer is used that exploits either multimode or single-mode light propagation in an optical fiber.

While multimode sensors use amplitude variations in the optical signals to sense and transmit the desired information, single-mode sensors use phase variations rather than amplitude variations. The single-mode sensors usually involve mechanisms for altering such properties of the fiber as path length or index of refraction to effect the desired phase variations in the optical signal. In the case of the fiber-optic gyroscope, the single-mode sensor measures acceleration which inherently alters the propagation of light even though the fiber is not affected. Thus, in contrast to multimode sensors, in single-mode sensors the uniformity and mechanism of light propagation and hence the characteristics of the fiber are especially critical.

Single-mode sensors are also sensitive to the state of polarization of the light in the fiber. If the fiber is not significantly polarization-holding or preserving, the state of polarization at the detector will tend to fluctuate randomly. Thus, for single-mode transducers, it is desirable to use elliptical-core or other kinds of pc'arization-holding fiber. See, e.g., McMahon et al., "Fiber-Optic Transducers," *IEEE Spectrum*, December 1981, pages 24–27.

There are well-known techniques for making long, continuous, single-mode optical fibers. Keck et al. U.S. Pat. No. 3,711,262 issued Jan. 16, 1973, for example, describes the conventional method of producing an optical waveguide by first forming a film of glass with a preselected index of refraction on the inside wall of a glass tube having a different index of refraction. The glass tube and glass film combination is then drawn to reduce the cross-sectional area and to collapse the film of glass to form a fiber having a solid cross-section. As a result of this process, the core is formed from the glass film, and the cladding is formed from the glass tube.

It is also known that multiple core and cladding layers may be deposited on the inside of a preform which is then collapsed and drawn, so that the preform tube becomes a support jacket around the core and cladding layers. Light propagated through a fiber formed in this manner is confined to the guiding region formed by the core and cladding layers and does not significantly interact with the support jacket. Consequently the optical properties of the support jacket can be considerably inferior to the optical qualities of the core and cladding. Details of this process for forming multiple core and cladding layers is disclosed in MacChesney et al., "A New Technique for the Preparation of Low-Loss and Graded-Index Optical Fibers," *Proceedings of the IEEE*, 62, at 1280 (1974), and Tasker and Ench, "Low-Loss Optical Waveguides with Pure Fused $SiO_2$ Cores," *Proceedings of the IEEE*, 62, at 1281 (1974).

It is known that elliptical-core, polarization-preserving optical fibers may be drawn from elliptical-core preforms. The preforms may be manufactured by collapsing a cylindrical preform or tube, with a slight vacuum in the center. Another method of manufacturing an elliptical-core preform is to fabricate the substrate tube to have a wall of non-uniform thickness and then collapse the tube by heating it to the softening point. The surface tension in the shaped wall, which occurs during the collapsing and subsequent drawing steps, causes the resulting fiber core to be elliptical in cross-section. See, e.g., Pleibel et al. U.S. Pat. No. 4,274,854 issued June 23, 1981.

As is known in the literature, e.g., Dyott et al., "Preservation of Polarization in Optical-Fiber Waveguides with Elliptical Cores", *Electronics Letters*, June 21, 1979, Vol. 15, No. 13, pp. 380–382, fibers with elliptical cores and a large index difference between the core and cladding preserve the polarization of fundamental modes aligned with the long and short axes of the ellipse, i.e., modes having their electric fields parallel to the major and minor axes of the ellipse. If the core-cladding index difference and the difference between the lengths of the major and minor axes of the ellipse are sufficiently large to avoid coupling of the two fundamental modes, the polarization of both modes is preserved.

SUMMARY OF THE INVENTION

It is a principal object of the present invention to provide an optical fiber which is easy to optically couple to optical devices and other optical fibers. In particular, one specific objective of the invention is to provide a polarization-holding optical fiber which is easy to align and couple to other polarization-sensitive devices without a substantial discontinuity in the preferred direction of polarization along the optical path.

Another object of the present invention is to provide optical fibers which can be easily coupled to each other at any desired locations along the lengths of the fiber.

A further object of the present invention is to provide optical fibers in extremely long, continuous strands having the above-mentioned attributes along their entire lengths.

Yet another object of the invention is to provide a method of drawing optical fibers having the above-mentioned properties.

Still another object of the invention is to provide a simple method of making a directional coupler from a pair of optical fibers wherein the required alignment and desired degree of coupling are easily obtained.

Other objects and advantages of the present invention will become apparent from the following detailed description and the accompanying drawings.

In accordance with the present invention, there is provided an optical fiber comprising a core and cladding having different refractive indices and forming a single-mode guiding region, the guiding region being located sufficiently close to the surface of the fiber, along a selected length of the fiber, to allow coupling to a guided wave, and the outer surface of the fiber having a non-circular cross-section with a predetermined geometric relationship to the guiding region so that the location of the guiding region can be ascertained from the geometry of the outer surface. The guiding region of the fiber preferably has a non-circular cross-section defining two transverse orthogonal axes which, in combination with the different refraction indices of the core and cladding, permits the de-coupling of waves polarized along said axes, and the non-circular cross-section of the outer surface of the fiber preferably has a predetermined geometric relationship to the transverse axes of the guiding region so that the orientation of those axes can also be ascertained from the geometry of the outer surface. A directional coupler is formed by joining two such fibers so that at least a portion of a wave propagated through either guiding region is coupled into the other guiding region.

There is also provided a method of making an optical fiber of the type described above by forming an optical preform having a core and a cladding with different refractive indices, the core being offset from the center of the preform and the outer surface of the preform having a non-circular cross-section with a predetermined geometric relationship to the core, and drawing an optical fiber from the preform with the drawing rate and temperature being controlled to produce a fiber with a cross-sectional geometry similar to that of the preform. The preform and drawn fiber preferably include a support layer surrounding the guiding region (formed by the core and the cladding) and forming the non-circular outer surface of the fiber, with the guiding region located sufficiently close to the surface of the fiber so that removal of a small amount of material from the fiber surface allows coupling to a guided wave. A directional coupler may be formed by removing a portion of the support layer from selected segments of two such fibers and then joining those segments of the fibers. As an alternative, a unitary directional coupler may be formed by inserting two such fibers into a tube with the guiding regions of the fibers aligned with each other and with the fiber surfaces closest to the respective guiding regions facing each other, and then drawing the tube while heating both the tube and the fibers so that the tube and fibers are all fused together; the fibers as well as the tube may be drawn sufficiently to reduce the diameters of the guiding regions therein, whereby the fields of the fiber cores are extended into the respective claddings to achieve a desired degree of coupling between the two fibers. As the two fibers are drawn, the coefficient of coupling may be monitored and the drawing process terminated when a desired degree of coupling is obtained.

While the invention is susceptible to various modifications and alternative forms, specific embodiments thereof have been shown by way of example in the drawings and will be described in detail herein. It should be understood, however, that it is not intended to limit the invention to the particular forms disclosed, but, on the contrary, the intention is to cover all modifications, equivalents, and alternatives falling within the spirit and scope of the invention as defined by the appended claims.

DESCRIPTION OF THE PREFERRED EMBODIMENTS

Figures 1, 2, 3, 4, 5, 6:
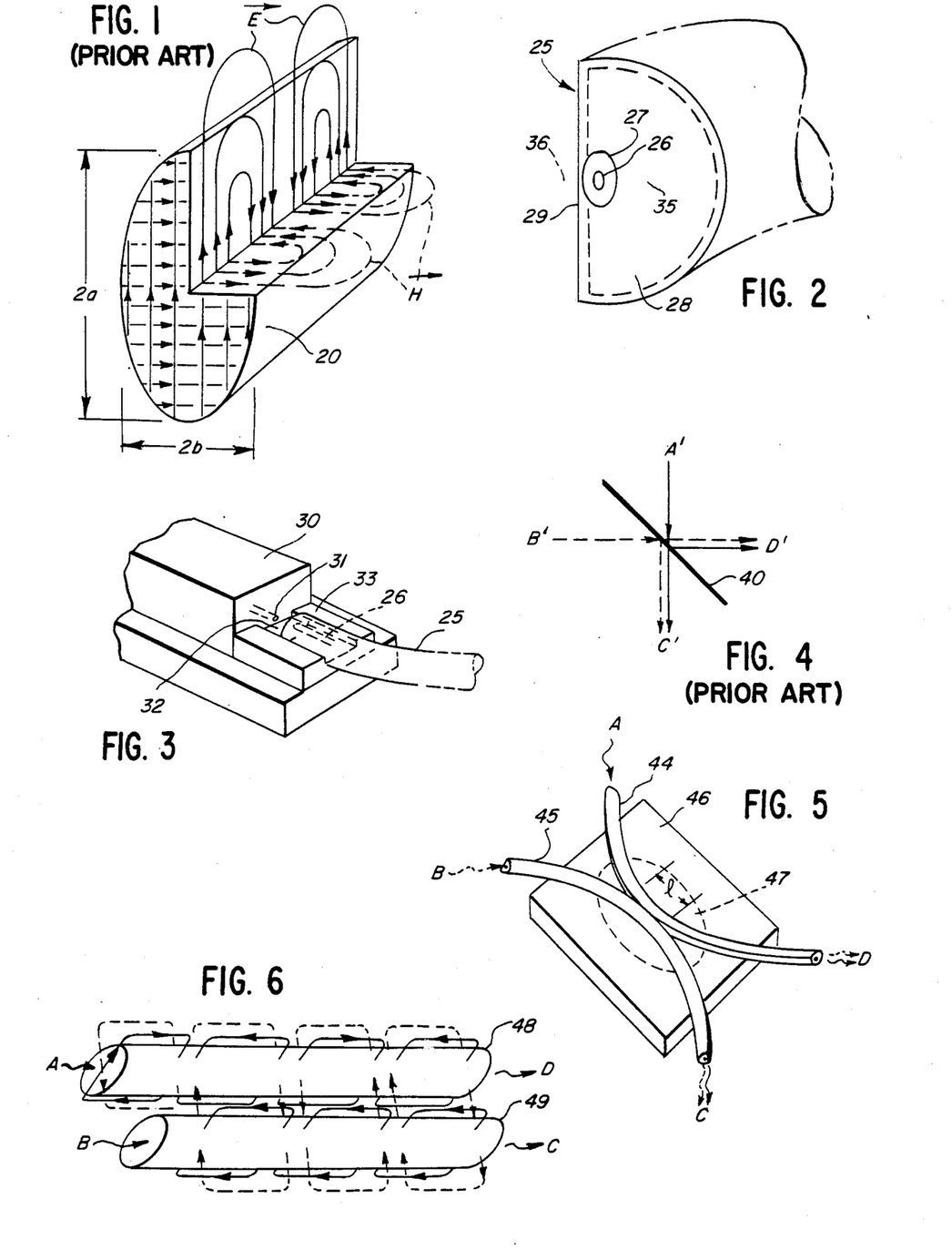
FIG. 1, labelled PRIOR ART, is a diagrammatic perspective view, in partial section, illustrating the electric and magnetic fields in their preferred directions of polarization in the elliptical core of a single-mode optical fiber waveguide.
FIG. 2 is an end view of the D-shaped optical fiber waveguide according to one preferred embodiment of the present invention.
FIG. 3 illustrates a method of interfacing the D-shaped optical fiber to an optical device.
FIG. 4, labelled PRIOR ART, illustrates an optical beam splitter.
FIG. 5 is a perspective view of a fiber-optic directional coupler embodying the present invention.
FIG. 6 is a schematic perspective view of the active area of the directional coupler of FIG. 5, showing the exchange of electromagnetic energy from the core of one fiber of the coupler to the core of the other fiber.

Turning now to FIG. 1, there is shown a dielectric core 20 for supporting the propagation of electromagnetic fields $\bar{E}$, $\bar{H}$ in the axial direction. This particular core 20 has an elliptical cross-section with a major diameter $2a$ and a minor diameter $2b$. A single-mode optical fiber has such a core 20 with a relatively high dielectric constant/index of refraction which tends to confine and guide electromagnetic energy (i.e., light) along the axis of the core. It is known that if the index of refraction of the core 20 is properly chosen in relation to the index of refraction of the surrounding medium, the core dimensions a, b, and the wavelength of the light, the distribution of the fields $\bar{E}$, $\bar{H}$ will tend to occur in a single, well-defined pattern, or mode. Shown in FIG. 1 is the field pattern for the $_oHE_{11}$ mode.

Single-mode propagation has the advantage of providing well-defined field patterns for coupling the fiber to optical devices. Another advantage is that the attributes of the light propagation, such as phase velocity and group velocity, are relatively constant as the light propagates down the fiber. The group velocity specifies how fast modulation or information travels down the fiber. Thus, for transmitting information over long distances it is important that the group velocity be relatively constant and in particular independent of frequency so that the information will be localized at a specific region rather than becoming "smeared out" as the information travels down the fiber. A constant phase velocity is important in fiber-optic sensor applications where the phase of a signal in a sensor fiber is compared to the phase of a reference signal in a reference fiber.

Single-mode propagation does not, however, guarantee that the polarization of the signal is fixed in any definite or constant angular relationship with respect to the core 20. Polarization is defined as the direction of the electric field vector $\bar{E}$. Thus, as shown in FIG. 1, the light is polarized a vertical direction.

In single-mode fiber-optic sensors, the phase of the optical signal at the end of a sensor fiber is made a function of an environmental parameter sought to be measured. Typically this phase-shift is introduced by physically lengthening the fiber, or by changing the index of refraction of the core 20. But if the core 20 is not polarization-preserving, the polarization of the light tends to change randomly as the light propagates down the axis of the core 20. Such a random change in polarization results in a fluctuation of the detected signal since a 180° rotation of the direction of polarization is equivalent, at the end of the fiber, to a 180° phase shift. Thus, for sensor applications, the polarization of the light should be maintained at a fixed angular relationship with respect to the fiber as the light propagates down the core.

To maintain or preserve the polarization of a signal in an optical fiber, the optical properties of the fiber must be anisotropic, or in other words a function of the angle of polarization with respect to the fiber. One method of making the optical fiber anisotropic is to make the core 20 have a cross-section which is elliptical or some other non-circular shape which defines two transverse orthogonal axes permitting the de-coupling of waves polarized along those axes. Signals which are launched into such fibers in alignment with one of the transverse axes tend to remain aligned with that axis as the signals are propagated through the fiber, thereby preserving the polarization of the signal.

In accordance with one important aspect of the present invention, the core of the guiding region in a single-mode optical fiber has a non-circular cross-section which defines two transverse orthogonal axes for holding the polarization of signals aligned with those axes, the guiding region being located sufficiently close to the surface of the fiber, along a selected length of the fiber, to allow coupling to a guided wave, and the outer surface of the fiber has a non-circular cross-section with a predetermined geometric relationship to the guiding region and the orthogonal transverse axes of the core so that the location of the guiding region and the orientation of the transverse axes can be asertained from the geometry of the outer surface. Thus, in the illustrative embodiment of FIG. 2, an optical fiber 25 has an elliptical core 26 with a relatively high index of refraction surrounded by a cladding 27 with a lower index of refraction. The dimensions and the refractive indices of the core 26 and the cladding 27 are selected to provide a single-mode guiding region. Because of its elliptical shape, this guiding region will also hold the polarization of optical signals propagated therethrough in alignment with either axis of the ellipse. That is, the major and minor axes of the elliptical cross-section represent two transverse orthogonal axes which permit the de-coupling of waves polarized along those axes.

Surrounding the guiding region formed by the core 26 and cladding 27 is a support layer 28 which provides the fiber with increased mechanical strength and ease of manipulation. Since this support layer 28 is not a part of the guiding region, its optical properties are not nearly as critical as those of the core 26 and the cladding 27. To prevent light from being trapped in the cladding 27, the support layer has an index of refraction higher than that of the cladding 27.

As can be seen in FIG. 2, by removing a thin portion of the support layer 28, and also a portion of the cladding 27 if necessary to achieve the desired degree of coupling (e.g., by etching to the dashed contour in FIG. 2), the guiding region formed by the core 26 and cladding 27 can be located sufficiently close to the surface of the fiber to allow coupling to a guided wave. As an alternative, a selected segment of the fiber can be drawn to reduce the fiber diameter within that segment and thereby expand the field of the guiding region to permit the coupling of guided waves to and from the guiding region in that segment of the fiber.

The outer surface of the fiber as defined by the support layer 28 in FIG. 2 has a D-shaped cross-section, with the flat surface 29 of the D extending parallel to the major axis of the elliptical guiding region on the side of the fiber closest to the guiding region. This D-shaped optical fiber is easily interfaced to a polarization-sensitive optical device by using the flat surface 29 of the D as an indexing surface. As shown in FIG. 3, an optical device 30, such as a solid state laser, has a point source of horizontally-polarized light 31 which may be coupled to the optical fiber 25 if the fiber 25 has its core 26 aligned with the source 31 and if its preferred direction of polarization is also horizontal. To facilitate the alignment, an indexing slide 32 may be scribed or photo-etched on a horizontal surface such as the top of a chip 33. The slide 32 may be fabricated using conventional photolithographic and other microelectronic fabrication techniques. Similarly, two fibers may be spliced coaxially using a chip with an indexing slot to align the flats of the D's.

The guiding region of the D-shaped fiber 25 of FIG. 2 is preferably offset or displaced from the geometric center 35 (i.e., centroid of mass or center of gravity of the transverse section) toward the flat 29 of the D along the perpendicular-bisector 36 of the flat. Preferably, the guiding region is located within a few average core diameters of the flat surface 29 so that the outer surface of a portion of the fiber may be etched to expose the guiding region at the surface 29, thereby permitting the transmission or gradual exchange of light between the guiding region and the fiber surface. For example, the guiding region can be located within about three average core diameters of the flat surface 29. For the elliptical core 20, the average core diameter is the sum (a+b) of the major and minor radii.

The fact that the flat surface 29 of the D is within a few average core diameters of the guiding region does not affect the attenuation or loss of the fiber since the flat surface 29 is not within the cladding 27. Although there is some light propagated within the cladding 27, substantially no light reaches the support layer 28 which forms the flat 29 of the D. But if an etchant such as hydrofluoric acid is applied to the outer surface of the fiber along a selected length, the flat surface 29 will be moved inwardly (e.g., to the dashed contour shown in FIG. 2), thereby allowing light between the core 26 and the flat surface 29 via the cladding 27. A fiber with a central core is difficult to etch in this fashion since there may not be any supporting layer remaining after the etching process.

Perhaps the most important application which requires the gradual exchange of light between the core and the surface of an optical fiber is a directional coupler. Directional couplers are the fiber-optic equivalents of optical beam splitters and are indispensable elements for making single-mode fiber-optic transducers. A beam splitter 40 is schematically shown in FIG. 4. The beam splitter 40 is essentially a partially silvered mirror which transmits a portion of the incident light and reflects the rest. A source of incident light A' is usually directed at 45° with respect to the plane of the beam splitter 40 so that the incident beam A' is split into a transmitted beam C' and a reflected beam D'. In addition to the beam-splitting function, the beam splitter 40 is also used to combine two incident beams A', B'. The incident beam B', shown in dashed representation, may also be directed at 45° with respect to the plane of the beam splitter 40 and at right angles to the incident beam A' so that the output beams C' and D' are combinations of the incident beams A' and B'.

There is shown in FIG. 5 an exemplary fiber-optic directional coupler comprised of two D-shaped optical fibers 44, 45, like the fiber 25 of FIG. 2, positioned adjacent each other on a flat substrate 46. The flat surfaces of the fibers 44, 45 contact each other along etched lengths 1, and their guiding regions are aligned to permit the gradual exchange of light between the guiding regions along the length 1 of the fibers. In the particular embodiment illustrated, alignment of the guiding regions of the fibers 44, 45 is facilitated because the D-shaped fibers 44, 45 are curved rather than straight in their unstressed configuration, with the flats of the D's located on the convex surfaces of the curved fibers. The curving or curling of the fibers is achieved by forming the fibers from materials which provide a large difference in the coefficients of thermal expansion of the support layer 28 and the grinding region formed by the core 26 and cladding 27. These two different portions of the fibers then contract at different rates during cooling after the fibers are drawn, producing the desired curvature illustrated in FIG. 5. With this curvature, the flats of the D's are aligned vertically when the curved fibers 44, 45 are laid flat on the substrate 46. Thus the fibers can simply be moved into engagement with each other along the etched lengths 1 and fastened together by a drop of adhesive 47.

The operation of the directional coupler of FIG. 5 is best understood in terms of an exchange or transfer of the electromagnetic fields $\overline{E}$, $\overline{H}$ propagating down the cores 48, 49 of the respective fibers 44, 45 as shown in FIG. 6. A portion of the electromagnetic field energy in the incident signal A is gradually transferred from one core 48 to the other core 49. In general, the relative amount of energy from signal A that is transferred from one core 48 to the other core 49 is proportional to the amount of coupling per unit length and the length 1 over which the coupling occurs.

Figures 7, 9:
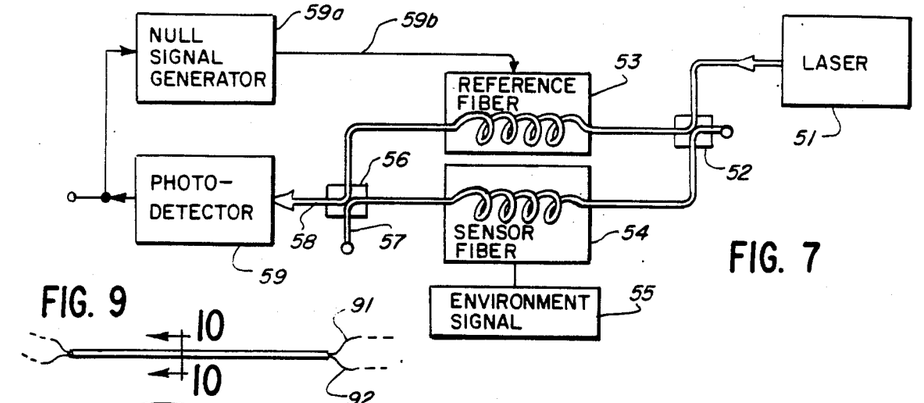
FIG. 7 is a schematic diagram of a single-mode fiber-optic sensor using continuous sensor and reference fibers and directional couplers integral with the fibers according to one embodiment of the present invention.
FIG. 9 is a plan view of a unitary directional coupler made according to a modified embodiment of the invention.

Directional couplers are used in devices such as single-mode interferometer sensors and fiber gyros. A generalized schematic diagram of a single-mode interferometer sensor using optical fibers and directional couplers according to the present invention is shown in FIG. 7. A coherent source of light such as a laser 51 emits light into an incident port of a directional coupler 52. The directional coupler 52 acts as a beam splitter and sends half of the light into a reference fiber 53 and the other half into a sensor fiber 54. The sensor fiber 54 is coupled to the environment so that the phase of the light in the reference fiber is modulated by a desired environment signal 55 by the time the light reaches a second directional coupler 56. This second directional coupler 56 accepts the light transmitted through the reference fiber 53 and the light transmitted through the sensor fiber 54 as incident signals, and acts as a combiner. Combined signals appear at two output ports 57, 58, one of which (57) is terminated (preferably with substantially no reflections) and the other of which (58) is fed to a photodetector 59.

The photodetector 59 is responsive only to the amplitude of the detected signal at the output port 58. The "beat phenomenon" generates a null in the relative response of the photodetector 59 when the phase difference is 180°, or one half of a wavelength of the coherent light. For maximum sensitivity, the null should be very sharp. But to get a sharp null, the sensor fiber signal and the reference fiber signal each must be phase coherent, and they must have equal amplitudes. The signals will be phase coherent if they propagate as single modes in the sensor and reference fibers. The amplitudes will be equal if half of the light 58 reaching the photodetector 59 passes through the reference fiber 53 and the other half passes through the sensor fiber 54. These proportions are set predominantly by the coefficient of coupling of the directional couplers 52 and 56, so it is important that these couplers have coefficients of coupling that are precisely defined and stable.

To some extent, the null can be sharpened by a null signal generator 59a which generates a null signal on a feedback line 59b to modulate the characteristics of the reference fiber 53. Thus the reference phase may be adjusted by the null signal generator 59a so that the difference between the sensor phase and reference phase is approximately 180°. The relative response is then always close to null.

It will be appreciated from the foregoing discussion that the system of FIG. 7 measures ambient conditions by the changes they effect in the sensor fiber 54 as compared to the reference fiber 53. Thus, maximum sensitivity is affected by the uniformity and mechanism of light propagation and the characteristics of the fibers, the directional couplers, and the connections between them. By using the D-shaped fiber of the present invention, there are no connections or joints in the reference fiber or the sensor fiber other than the couplings at the directional couplers; thus, the propagation of light through the system is not affected by the reflections or changes in optical properties that can occur at fiber terminations. The directional couplers 52, 56 are easily fabricated at any point along the length of the D-shaped fiber so that, for example, they may be fabricated on relatively short lengths of fiber extending from a large spool of fiber comprising the sensor fiber 54.

The maximum sensitivity of the fiber-optic sensor shown in FIG. 7 is ultimately set by the relative change in sensor phase of the sensor fiber 54 as a function of the environment signal 55, and the level of light received at the end of the sensor fiber. Since the total phase change is usually directly proportional to the length of the sensor fiber 54, it may be desirable to use an extremely long low-loss sensor fiber.

In accordance with another important aspect of the present invention, the optical fiber is made by forming a preform having a core and a cladding forming a guiding region which is offset from the center of the preform and has a non-circular cross-section defining two transverse orthogonal axes, the outer surface of the preform also having a non-circular cross-section with a predetermined geometric relationship to the guiding region and its transverse axes; and drawing an optical fiber from the preform with the drawing rate and temperature being controlled to produce a fiber with a cross-sectional geometry similar to that of the preform. The guiding region of the drawn fiber is preferably located sufficiently close to one side of the fiber that the removal of a relatively small amount of material from the outer surface of the fiber allows coupling of guided waves to and from the guiding region.

Thus, the preform can have the same cross-sectional configuration as the fiber 25 illustrated in FIG. 2. Such a preform can be made by first forming a cylindrical preform with an elliptical core and cladding located in the center thereof (using techniques known in the art), and then grinding one side of the preform to form a D-shaped cross-section with the flat surface of the D extending parallel to the major axis of the elliptical core. An optical fiber is then drawn from the D-shaped preform at a drawing rate and temperature controlled to produce the fiber 25 of FIG. 2, i.e., with a cross-sectional geometry substantially the same as that of the preform.

Figure 8:
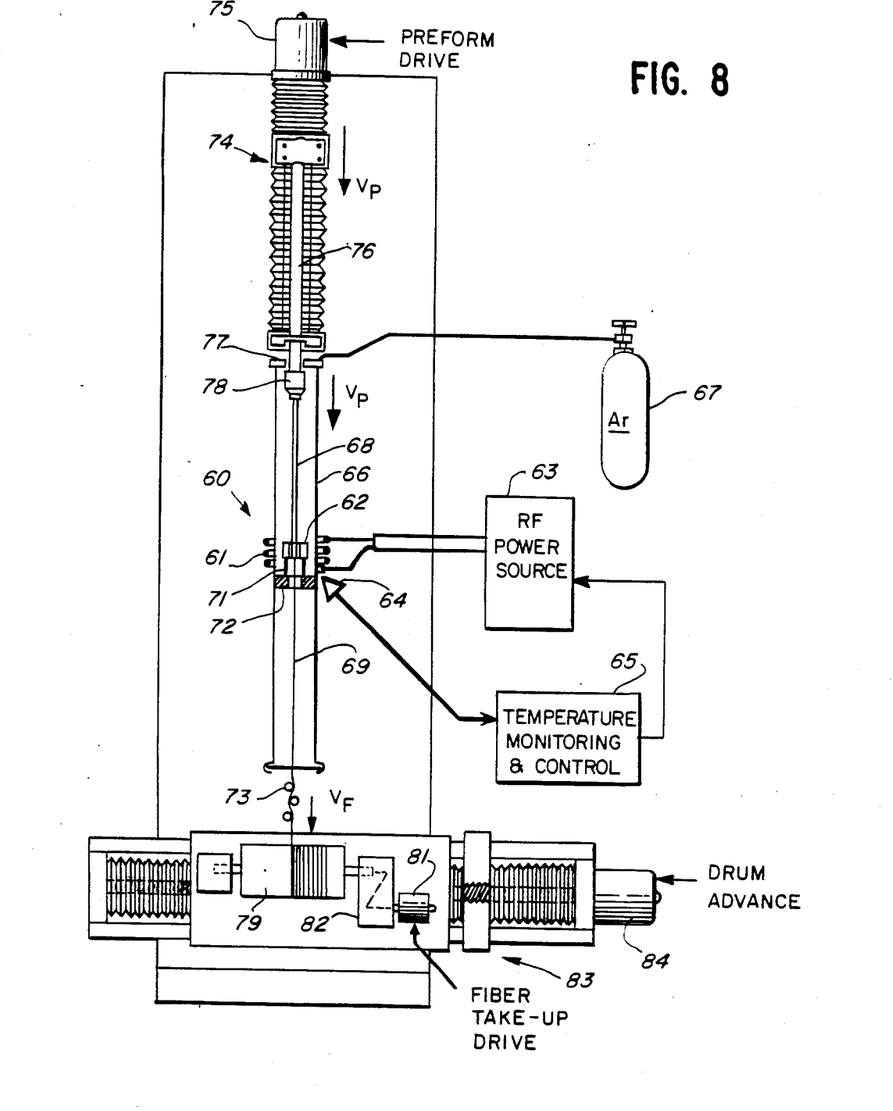
FIG. 8 is a partially schematic side elevation of apparatus for drawing optical fiber according to the present invention.

A drawing machine suitable for precise control of the drawing process is shown in FIG. 8. In order to heat the preform to approximately the softening temperature, the central component of the drawing machine is an induction furnace generally designated 60 comprising an external induction coil 61 and an internal graphite toroid 62. The toroid 92 is approximately an inch long, an inch in diamter, and has a core hole about a quarter inch in diamter. The induction coil 61 is energized by a radio-frequency power source 63 so that electrical heating currents are induced in the graphite toroid 62, the resulting temperature being measured by an optical pyrometer 64 and monitored by a control unit 65 adjusting the power source 63. In order to prevent the graphite toroid 62 from burning up, the toroid 62 is disposed within a vertical glass cylinder 66 which is filled with a relatively inert gas such as argon from a supply 67.

The preform 68 is fed from the top of the cylinder 66 and passes through the center of the graphite toroid 62. The toroid 62 is heated white hot causing the preform 62 to soften. The drawing of the fiber 69 from the preform 68 occurs approximately at the center of the toroid 62. The toroid 62 has legs 71 which stand on a support ring 72 attached to the glass cylinder 66.

The critical parameters affecting the drawing process are the rate of feed $V_p$ of the preform 68 toward the drawing point, the temperature at the drawing point, and the rate $V_f$ at which the fiber 69 is drawn from the drawing point. The temperature and rate of drawing $V_f$ set the tension at which the fiber 69 is drawn, and this tension may be further regulated by a series of tensioning rollers 73 which also assure that the fiber 69 is drawn coaxially out of the bottom of the glass cylinder 66. The rate of feed of the preform $V_p$ is established by a vertical linear slide generally designated 74 having a lead screw driven by a drive motor 75. A vertical shaft 76 is actuated by the slide 74 and extends into the glass cylinder 66 through a gas seal 77. At the end of the shaft 76 is a Phillips chuck 78 which grips the top end portion of the preform 68. The rate of drawing $V_f$, on the other hand, is established by a horizontal take-up drum 79 below the lower end of the glass cylinder 66. The take-up drum 79 is journaled for rotation and driven by a take-up motor 81 through a speed reduction gear assembly 82. To wind the fiber 73 in a helical fashion on the take-up drum 79, the drum as well as the take-up drive itself is mounted on a horizontal linear slide generally designated 83 having a lead screw driven by a drum advance motor 84.

In one particular example, a preform was made by depositing a pure silica cladding and a germania core on the inside surface of a silica tube. The cladding and core were formed by the thermal decomposition of silicon tetrachloride and germanium tetrachloride, which were circulated through the bore of the silica tube at approximately 1800° C. in an induction furnace. Diametrically opposed portions of the outside surface of the silica tube were then ground flat, after which the tube was collapsed and lightly drawn to form a preform having an outer surface with a cylindrical cross-section with a diameter of about 2.8 mm. and a central core and cladding of elliptical cross-section. One side of the elliptical-cored preform was then ground flat, with the plane of the flat surface extending parallel to the major axis of the elliptical core and located within a few thousands of an inch of the cladding. The preform thus had a D-shaped cross-section. Optical fiber was then drawn from this D-shaped preform at a temperature of about 1790° C. while feeding the preform at a rate of about 0.3 mm/sec. and while pulling fiber from the preform at a rate of about 0.5 m/sec. These parameters were chosen to result in a drawing tension as high as practical without breaking the fiber. The resulting fiber had a D-shaped cross-section illustrated in FIG. 2, with a maximum outside diameter of about 85 microns. The shape of the cross-section is retained as the preform is drawn into a fiber due to the high drawing tension, the relatively small diamter of the preform, and the precise temperature and localized heating of the induction furnace.

As another feature of the present invention, a unitary directional coupler is formed by inserting two of the fibers of FIG. 2 into a tube with the guiding regions of the two fibers aligned with each other and with the fiber surfaces closest to the respective guiding regions facing each other, and then drawing the tube while heating both the tube and the fibers so that the tube and fibers are all fused together. The fibers are preferably drawn along with the tube so as to reduce the diameters of the guiding regions therein, whereby the fields of the fiber cores are extended further into the respective claddings to achieve a selected degree of coupling between the two fibers. If desired, the coefficient of coupling may be monitored during the drawing operation and the process terminated when a desired degree of coupling is obtained.

Figures 10, 11:
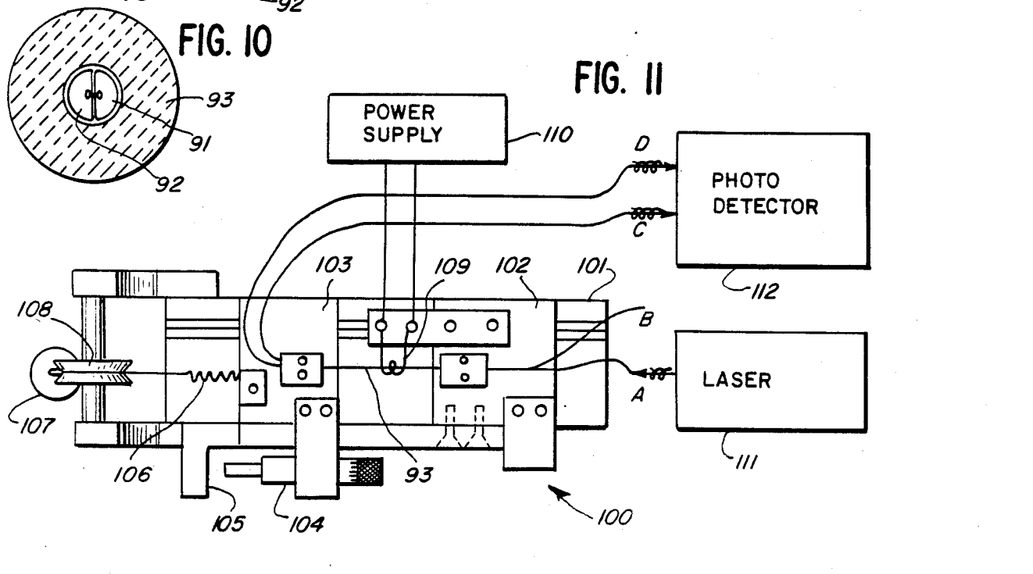
FIG. 10 is an enlarged section taken generally along line 10—10 in FIG. 9.
FIG. 11 is a plan view of a miniature pulling machine for fusing together the assembly of FIGS. 9 and 10 to form a directional coupler.

Thus, according to an exemplary method illustrated in FIGS. 9 and 10, a pair of fibers 91, 92 are threaded into the bore of a silica tube 93. The fibers 91, 92 are preferably the D-shaped fibers of FIG. 2 and are inserted into the tube 113 with the flat surfaces of the D's facing each other. The bore of the silica tube 93 is just slightly greater in diameter than the diameter of the combined pair of fibers so that the guiding regions of the fibers 91, 92 are automatically aligned when the fibers are inserted into the tube 93. Alternatively, the pair of fibers 91, 92 may be aligned and tacked together at an intermediate location by an electric arc so that alignment will be provided by the tacking rather than relying solely on a close fit between the fibers and the bore of the silica tube 93. The end portions of the silica tube 93 are then clamped into a miniature pulling machine generally designated 100 in FIGS. 11 and 12.

Figure 12:
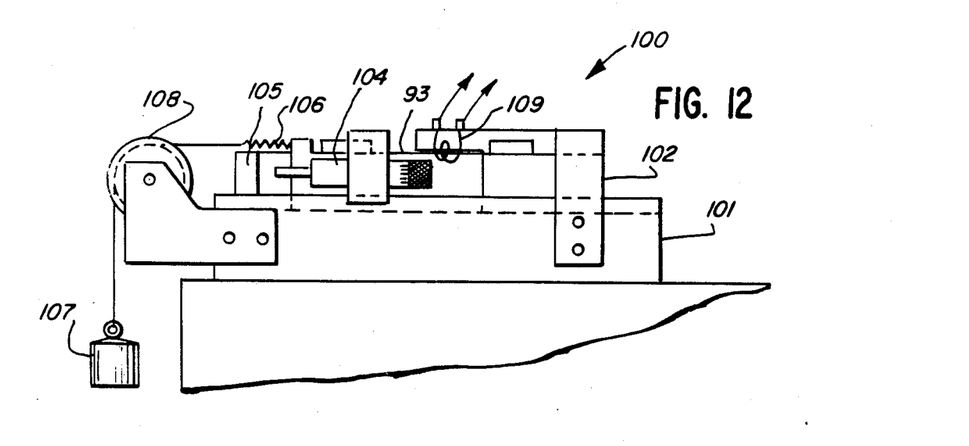
FIG. 12 is a front elevation of the miniature pulling machine of FIG. 11.

The pulling machine 100 is comprised of a linear slide base 101 receiving a block 102 fixed to the base, and a sliding block 103 also received by the base. The slide base 101 and blocks 102, 103 are optical bench components. One end portion of the silica tube 93 is clamped to the fixed block 102 and the other end portion is clamped to the sliding block 103. The linear motion of the sliding block 103 with respect to the fixed block 102 is limited by a stop 105 fastened to the fixed block cooperating with a micrometer 104 fixed to the sliding block. Thus, after the end portions of the silica tube 103 are clamped between the blocks 102, 103, the gap between the micrometer 104 pole face and the cooperating surface of the stop 105 may be adjusted to set the degree of extension of the silica tube 93 when it is drawn. The drawing tension is regulated by a spring 106 and is further set by a weight 107 strung over a pulley 108.

The drawing of the silica tube 93 occurs when it is heated to the softening point by a platinum coil 109 which is energized by a power supply 110. The cross-sectional area of the tube 93 decreases as it is drawn, thereby closing in on and squeezing the D fibers together. The coefficient of coupling between the optical fibers 91, 92 is monitored during the drawing process by exciting an input port A of the coupler with a laser 111 and measuring the response at output ports C and D with a photodetector 112. The apparatus shown in FIGS. 11 and 12 is semi-automatic, it being understood that the drawing process may be repeated a number of times while the coefficient of coupling is monitored until the desired coefficient of coupling is obtained.

While the method shown and described in conjunction with FIGS. 9-12 uses D-shaped fibers to form a directional coupler, it should be understood that other off-center core optical fibers may be coupled using this technique. To accommodate an off-center core fiber having an arbitrary external cross-section, the cores may be first positioned together and then tacked. If an off-center core fiber is used which has a relatively large spacing between the outer surface of the fiber and the core, the portions of the fibers to be coupled should first be etched to expose the guiding regions on the fiber surfaces closest to the guiding regions.

The method of fabricating directional couplers illustrated in FIGS. 9-12 results in a unitary assembly wherein the fibers 61, 62 and the silica glass tube 63 are fused together at an intermediate location. In contrast to the design of FIG. 5, the unitary directional coupler is more suited for applications such as the fiber gyro which require the coefficient of coupling to be stable over long periods of time and also insensitive to mechanical shocks and other environmental stresses.

I claim as my invention:

1. A continuously drawn optical fiber comprising a single core and cladding having different refractive indices and forming a single-mod guiding region,
   said core having a non-circular cross-section defining two transverse orthogonal axes, said core having a longer transverse dimension along one of said orthogonal axes than along the other of said axes for guiding two fundamental modes, one of said modes having an electric filed parallel to the axis of the longer transverse dimension and the other of asid modes having an electric field parallel to the axis of the shorter transverse dimension,
   the difference in the core dimensions along said orthogonal transverse axes and the difference between the refractive indices of said core and cladding being sufficiently large to de-couple the fundamental modes so that the polarization of said modes is preserved within the fiber,
   said guiding region being offset from the geometric center of the fiber and located sufficiently close to one side of the surface of the fiber to allow coupling to a guided wave through said one side by exposure or expansion of the field of the guiding region, and
   the outer surface of the fiber having a non-circular cross-section forming an indexing surface with a predetermined geometric relationship to said guiding region and said orthogonal transverse axes so that the location of said guiding region and the orientation of said axes can be ascertained from the geometry of said indexing surface on the exterior of the fiber.

2. An optical fiber as set forth in claim 1 wherein said core has an elliptical cross-section.

3. An optical fiber as set forth in claim 1 wherein said indexing surface is substantially parallel to one of said transverse axes of said core.

4. An optical fiber as set forth in claim 1 which includes a support layer surrounding said guiding region and forming said non-circuolar outer surface of the fiber.

5. An optical fiber as set forth in claim 4 wherein said support layer has an index of refraction higher than that of said cladding.

6. An optical fiber as set forth in claim 4 wherein said support layer and said guiding region have different coefficients of thermal expansion so that the fiber has an unstressed configuration that is curved along its length, with the guiding region located close to the convex surface of the curved fiber.

7. An optical fiber as set forth in claim 1 wherein the outer surface of the fiber has a generally D-shaped cross-section.

8. An optical fiber coupler comprising a pair of optical fibers, each of said fibers having a structure as set forth in claim 1, the guiding regions of said fibers being coupled together so that at least a portion of a wave propagated through either guiding region is coupled into the other guiding region.

9. An optical fiber coupler as set forth in claim 8 wherein said fibers and tube form a unitary structure.

10. A method for forming a directional coupler from a pair of continuously drawn optical fibers, each of which comprises a single core and cladding having different refractive indices and forming a single-mode guiding region,
    said core having a non-circular cross-section defining two transverse orthogonal axes, said core having a longer transvere dimension along one of orthogonal axes than along the other of said axes for guiding two fundamental modes, one of said modes having an electric field parallel to the axis of the longer transverse dimension and the other of said modes having an electric field parallel to the axis of the shroter transverse dimension, the difference in the core dimension along said orthogonal transverse axes and the difference between the refractive indices of said core and cladding being sufficiently large to de-couple the fundamental modes so that the polarization of said modes is preserved within the fiber, said guiding region being offset from the geometric center of the fiber and located sufficinetly close to one side of the surface of the fiber, to allow coupling to a guided wave through said one side by exposure or expansion of the field of the guiding region, the outer surface of the fiber having a non-circular cross-section forming an indexing surface with a predetermined geometric relationship to said guiding region and said orthogonal transverse axes so that the location of said guiding region and the orientation of said axes can be ascertained from the geometry of said indexing surface on the exterior of the fiber, said method comprising joining said fibers along selected lengths thereof with said guiding regions aligned with and coupled to each other along said selected lengths, and with the fiber surfaces that are closest to the respective guiding regions facing each other.

11. A method forming a directional coupler from a pair of optical fibers each of which comprises a core and cladding having different refractive indices and forming a single-mode guiding region, said core hving a non-circular cross-section defining two transverse orthogonal axes, said core having a longer transverse dimension along one of said orthogonal axes than along the other of said axes for guiding two fundamental modes, one of said modes having an electric field parallel to the axis of the longer transverse dimension and the other of said modes having an electric field parallel to the axis of the shorter transverse dimension, the difference in the core dimensions along said orthogonal transverse axes and the difference between the refractive indices of said core and cladding being sufficiently large to de-couple the fundamental modes so that the polarization of said modes is preserved within the fiber, said guiding region being offset from the geometric center of the fiber and located sufficiently close to one side of the surface of the fiber to allow coupling to a guided wave through said one side by exposure or expansion of the field of the guiding region, the outer surface of the fiber having a non-circular cross-section forming an indexing surface with a predetermined geometric relationship to said guiding region and said orthogonal transverse axes so that the location of said guiding region and the orientation of said axes can be ascertained from the geometry of said indexing surface on the exterior of the fiber, said method comprising the steps of inserting said fibers into a tube with the guiding regions of the two fibers aligned with each other and with the fiber surfaces closest to the respective guiding regions facing each other within said tube, and drawing the tube while heating both the tube and the fibers so that the transverse dimensions of both fibers are reduced to expand the fields of the respective guiding regions of the two fibers, while at the same time fusing together the tube and the fibers.

12. A method of forming a directional coupler as set forth in claim 11 in which said tube and said fibers are drawn sufficiently to reduce the diameters of the guiding regions therein, whereby the fields of the fibers cores are extended into the respective claddings to achieve a selected degree of coupling between the two fibers.

13. A method of forming a directional coupler as set forth in claim 11 which includes the steps of monitoring the coefficient of coupling between said fibers during said drawing step, and terminating said drawing when the coefficient of coupling reaches a desired level.

14. The optical fiber as claimed in claim 7, wherein the core is elliptical, having a major axis parallel to the flat ofthe D-shaped external cross-section, the distance from the flat to the core being less than three average core diameters.

15. The optical fiber as claimed in claim 1 wherein the outer surface of the fiber forms a flat surface which is aligned parallel to one of said trasnverse axes of the core.

16. The optical fiber as claimed in claim 15, wherein the distance from the flat surface to the core is within approximately three average diameters of the core.

17. A continuously drawn optical fiber comprising a single core and cladding having different refractive indices and forming a single-mode guiding region, said core having a non-circular cross-section defining two transverse orthogonal axes, said core having a longer transverse dimension along one of said orthogonal axes than along the other of said axes for guiding two fundamental modes, one of said modes having an electric field parallel to the axis of the longer transverse dimension and the other of said modes having an electric field parallel to the axis of the shorter transverse dimension, the difference in the core dimensions along said orthogonal transverse axes and the difference between the refractive indices of said core and cladding being sufficiently large to de-couple the fundametnal modes so that the polarization of said modes is preserved within the fiber, said guiding region being offset from the geometric center of the fiber and located sufficiently close to one side of the surface of the fiber to expose the field of the guiding region along a selected length of the fiber, to allow coupling to a guide wave through said one side, the outer surface of the fiber having a non-circular cross-section forming an indexing surface with a predetermined geometric relationship to said guiding region and said orthgonal transverse axes so that the location of said guiding region and the orientation of said axes can be ascertained from the geometry of said indexing surface on the exterior of the fiber.

18. A continuously drawn optical fiber comprising a single core and cladding having different refractive indices and forming a single-mode guiding region, said core having a non-circular cross-section defining two transverse orthogonal axes, said core having a longer transverse dimension along one of said orthogonal axes than along the other of said axes for guiding two fundamental modes, one of said modes having an electric field parallel to the axis of the longer transverse dimension and the other of said modes having an electric field parallel to the axis of the shorter transverse dimension, the difference in the core dimensions along said orthogonal transverse axes and the difference between the refractive indices of said core and cladding being sufficiently large to de-couple the fundamental modes so that the polarization of said modes is preserved within the fiber, said guiding region having reduced transverse dimensions along a selected length of the fiber to expand the field of the guiding region along that selected length, said guiding region also being offset from the geometric center of the fiber and located sufficiently close to one side of the surface of the fiber to allow coupling to a guided wave through said one side via said expanded field along said selected length, the outer surface of the fiber having a non-circular cross-section forming an indexing surface with a predetermined geometric relationship to said guiding region and said orthogonal transverse axes so that the location of said guiding region and the orientation of said axes can be ascertained from the geometry of said indexing surface on the exterior of the fiber.

* * * * *